United States Patent Office 3,054,928
Patented Sept. 18, 1962

3,054,928
PHOTOELECTRICALLY CONTROLLED
SWITCHING DEVICE
Gotthilf Schrenk, Helmut Peter, and Ernst Wiener, all of Erlangen, Germany, assignors to P. Gossen & Co. G.m.b.H., Erlangen, Germany
Filed July 7, 1960, Ser. No. 41,305
Claims priority, application Germany July 18, 1959
14 Claims. (Cl. 315—157)

The invention pertains to a switching device employing gas-discharge tubes, which have switching relays in their plate circuits and whose control circuits are connected through circuit elements with the photoelectric cells of a photoresponsive contactor.

One feature of the invention is a switching device that serves as a control contactor for the positioning elements of a regulating device that periodically fluctuates between a lower and upper limiting value of the quantity to be controlled.

Another feature of the invention is a monitoring device for electrical installations or other such installations in which the quantity of interest can be represented in an electrical form. This monitoring device possesses the advantage that an alarm signal or the like triggered by it can be shut off only when the quantity being monitored has returned to its normal value.

Another feature of the invention, in combination with each of the two features of the invention just mentioned is a photoresponsive contacting instrument for the monitoring device or the fluctuating contactor that possesses means for preventing false contacting when the pointer of the measuring instrument with its masking vane has swung past the position of one of the photoelectric cells because of a large and rapid change in the measured value. This increases considerably the practical value of the monitoring device.

The invention is described below in connection with these drawings.

Figure 1:
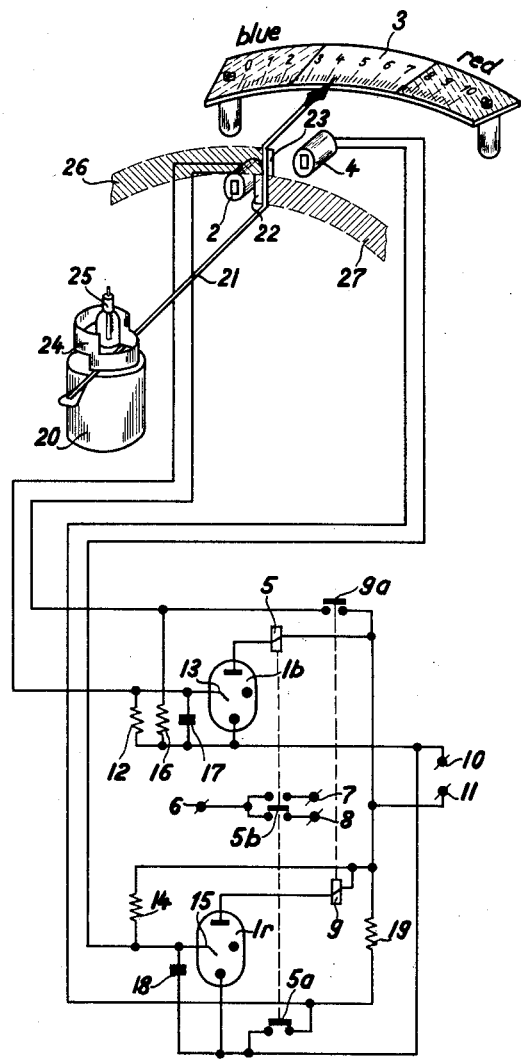
FIG. 1 shows the contact instrument and the circuit diagram of a reversing switching device connected to the contact instrument.

According to FIG. 1 the reversing switching device includes two gas discharge tubes 1b and 1r. The index b signifies that the tube in question operates together with the photoelectric cell of the contact instrument described in detail later on, which is assigned to the lower limiting range shown in blue, for example, on the scale 3. Similarly, the tube 1r operates together with the photoelectric cell 4, which is assigned to the range shown in red above the upper switching point.

In the plate circuit of he switch tube 1b there is the relay 5 with its contacts 5a and 5b. The normally closed contact 5a is in the circuit of tube 1r, whereas the make- and break-contact 5b serves merely as a switch element for the positioning unit of an electrical control system, which is to be connected to terminals 6, 7 and 8.

In the plate circuit of the gas-discharge tube 1r, there is a relay 9 with its operating contact 9a, which is in the circuit of the tube 1b. Both tubes are operated with alternating current, which is supplied through the connector terminals 10 and 11.

The photoelectric cell 2, together with the resistor 12, constitutes a potentiometer or voltage divider, which is connected across the plate voltage, with the starter electrode 13 of the gas-discharge tube 1b connected to its intermediate point. This circuit of the control circuit is known as the so-called "bright circuit," signifying that the respective tube carries current when the photoelectric cell is "bright," i.e. is illuminated.

The photoelectric cell 4, on the other hand, is connected across the plate voltage together with the resistor 14, as the lower voltage divider or potentiometer. Again, the starter 15 of tube 1r is connected to the intermediate point. This circuit is known as the so-called dark circuit, signifying that the tube is ignited when the photoelectric cell is "dark," i.e. is masked.

Furthermore, a resistor 16 is connected to tube 1b in the manner shown, together with capacitor 17, which serves to maintain and prolong the firing phenomena in the tube. Similarly, the starter 15 of the tube 1r has the capacitor 18 connected to it, whereas resistor 19 is connected somewhat differently than is resistor 16 to tube 1b.

The photoresponsive contact instrument itself consists of a measuring device 20 of any type, such as a moving coil galvanometer, the measuring-device pointer 21, the small masking vanes 22 and 23 attached to the latter, and the annular part 24, which surrounds the miniature incandescent bulb 25. The annular and stepped part 24 is attached to the measuring-device pointer so as to be concentric with the latter's axis of rotation and serves as an auxiliary shutter to supplement the masking of the photoelectric cells. The photoelectric cells are located in two different planes parallel to the plane of the pointer. The annular shutter is mounted in such a way with respect to the bend in the pointer and the miniature lamp 25 that the shadow zones 26 and 27 are produced during projection. For example, if a powerful impulse makes the measuring-device pointer together with the shutter 23 swing to the right past the photoelectric resistor 4, the latter remains in shadow, namely, by the shadow zone 26. The advantage of this is that the shutters 22 and 23 are made very small, compared to known designs with long shutters, and can be placed comparatively close to the tip of the pointer because of their resultant likeness, thus affording increased switching accuracy. The small shutters also make it possible to reduce the balancing weight, thus producing a two-fold diminution of the moment of inertia. The size of the annular shutter 24 is governed by the miniature incandescent lamp 25 and, when the latter is appropriately chosen, can likewise be kept very small. As this shutter is centered on the axis of rotation, its moment of inertia does not affect balance at all and affects the moment of inertia of the entire moving system only very little.

To facilitate understanding of the following functional description of this reversing or oscillating switching device, reference is made to the table in FIG. 1, which indicates the states of the measuring-device pointer, of the switch tubes 1b and 1r, and of the contacts 5a and 9a of the respective relays 5 and 9. The initial state is one in which the measuring-device pointer is located in the blue region (b) of the measuring-device scale; it is assumed that the pointer travels below the nominal value region, thus casting a shadow over the photoresistor 2. The tube 1b is then extinguished. The same holds true for tube 1r, for photoresistor 4 is illuminated, so that there is not enough voltage for ignition across the starter of this tube. This state is shown in FIG. 1.

But as tube 1r is extinguished, relay 9 remains in the released state, so that operating contact 9a is open.

Therefore, nothing can be changed in this state of the device if the measuring-device pointer moves from the blue region into the nominal region. To be sure, the illumination of photoresistor 2 makes its resistance sufficiently low for ignition; however, current cannot be supplied to the potentiometer because the contact 9a is open.

This situation changes only when the measuring-device pointer reaches the red scale region as the measured value continues to increase. Now photoresistor 4 is in shadow; its resistance, which is now sufficiently high, makes it possible for a starter potential to build up resistance that is high enough to fire tube 1r. As this tube fires, relay 9 is actuated, closing contact 9a in the upper portion of the circuit. The upper end of photoresistor 2 is now connected to the operating voltage. But as this photoresistor is still illuminated, tube 1b can likewise fire. Relay 5 pulls in, opening contact 5a of the lower part of the circuit. This breaks the connection to photoresistor 4. A comparatively high potential is now applied across it through the resistor 19 which is connected to the plate voltage. The resistor 19 is dimensioned so as to make this potential high enough for the tube 1r to remain ignited even when the measuring-device pointer 21 swings back into the nominal range, and the photoresistor 4 is again in shadow.

As the relay 5 pulls up, the contact 5b of the external circuit simultaneously reverses, now connecting the terminals 6 and 7. This reverses the device that supplies the measured value, e.g. to an electric furnace, by means of a suitable follow-up circuit so that the measuring-device pointer 21 begins to travel across the scale in the opposite direction.

Once the measuring-device pointer again reaches the nominal range, no change takes place in the situation just described, as a holding potential is fed to the starter of tube 1r via resistor 19, as mentioned above. Thus relay contact 9a of the upper half of the circuit remains closed, so that tube 1b continues to receive adequate firing voltage via the low resistance of the still-illuminated photoresistor tube.

Only when the returning measuring-device pointer again reaches the blue region, is one of the tubes extinguished, viz. the tube 1b, for now the high dark resistance of the photoresistor 2, produced by its being in shadow, is now in series with its starter, so that the starter potential is no longer adequate for firing. As relay 5 drops, the external circuit control contact 5b is also reversed, so that now terminals 6 and 8 are again connected together. At the same time contact 5a also closes, grounding photoresistor 4 at its lower end. But since this photoresistor is illuminated and hence possesses a low resistance, tube 1r is also extinguished. This returns the device to its initial state.

Figures 1A, 2, 2A:
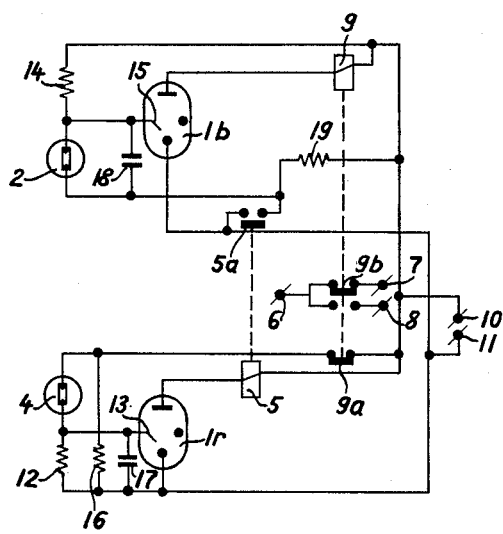
FIG. 1a is a diagram illustrating the operation of the circuit of FIG. 1.
FIG. 2 shows the circuit diagram of another reversing switching device, in which the gas-discharge tubes exhibit different conductivity states from those in FIG. 1 with respect to the masking of the photoelectric cells.
FIG. 2a is a diagram illustrating the operation of the circuit of FIG. 2.

The control functions assigned to the gas-discharge tubes and their photoresistors, namely, the "bright" and "dark" circuits, can also be interchanged without requiring any change in the values of the components. Such a modified circuit for a reversing device is shown in FIG. 2, in which the photoresponsive contactor instrument is no longer shown for reasons of simplification. We again start with the condition in which the measuring-device pointer is in the blue region of the scale, so that photoelectric cell 2 is in shadow.

In contrast to the circuit described above, both gas-discharge tubes now carry current for the same initial stage of the photoresponsive contactor instrument. For, on the one hand, a starter potential that is high enough to fire tube 1b can build up at the high dark resistance of the photoresistor 2, so that the working contact 9a closes. But this, on the other hand, impresses a voltage across the photoresistor 4, 12, and a sufficiently high firing voltage is impressed across the starter of tube 1r through the low internal resistance of illuminated photoresistor 4.

As this tube fires, contact 5a is opened. This disconnects photoresistor 2 from ground, and the potential fed to it from resistor 19 is supplied to starter electrode 15 of tube 1b as a holding potential.

Thus no change can occur in the stage just described, even when the measuring-device pointer travels into the nominal region, and photoelectric cell 2 is again illuminated.

Only when the measuring-device pointer reaches the red scale region in the course of its travel is the circuit reversed. First photoresistor 4 is cast in shadow. This lowers the starter potential of tube 1r, so that the latter is extinguished. As relay 5 drops, contact 5a is closed, so that tube 1b is likewise de-energized, since the holding potential supplied up to then through the resistor 19 is now short-circuited through the contact 5a, while on the other hand photoelectric cell 2 is illuminated.

This also opens the contact 9a. The external circuit contacts 6, 7 and 8 are also reversed. In this diagram these contacts are shown mounted on relay 9 in order to demonstrate that they can be mounted as desired and without any restrictions either on relay 5 or on relay 9.

As the measuring-device pointer returns, no change occurs until it again enters the blue region of the scale and throws photoresistor 2 in shadow. Now the high dark value of photoresistor 2 causes tube 1b to receive a sufficiently high starter potential, and it fires. Relay 9 pulls up, closing the switch contact 9a assigned to the tube 1r, so that the starter circuit of this tube is connected across the operating voltage. Moreover, as photoresistor 4, assigned to the red zone of the scale, is illuminated, tube 1r also fires, thus returning the device to the initial state. The resistor 16 shown in FIGS. 1 and 2 and not explained thus far is not required for the functioning of the circuits of FIGS. 1 and 2, but it is required in FIG. 3. Each of FIGS. 3 and 4 shows one-half of one of the reversing circuits described as a monitoring device, while on the other hand all four circuits shown employ the same principle of operation.

In the monitoring devices of FIGS. 3 and 4 the photoresistor is denoted by 2, 4, in order to express the fact that the monitoring devices can be used both to protect the installation against exceeding a given upper limit of the measured value or against going below a lower limit of the measured value.

Figure 3:
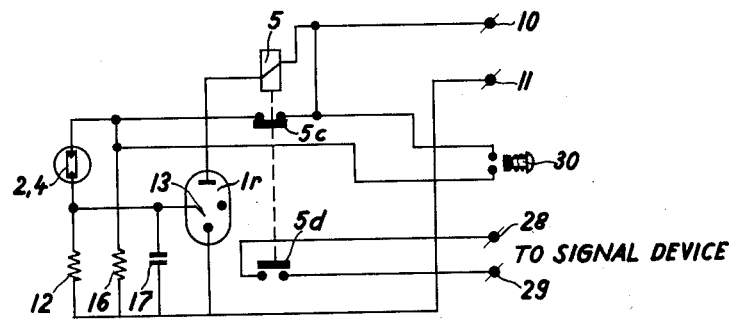
FIG. 3 shows the circuit of one-half of a reversing switching device that serves as a monitoring device.
Figure 4:
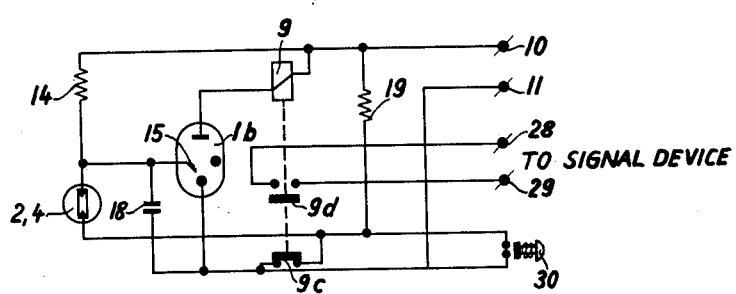
FIG. 4 shows another embodiment of this monitoring device.

In the embodiment of FIG. 3 photoelectric cell 2, 4 is connected in the so-called bright circuit. From the standpoint of circuitry, this circuit thus corresponds exactly to the lower half of the circuit in FIG. 2 or to the upper half of the circuit in FIG. 1. A pushbutton switch 30 is likewise shown in the circuit. This switch is shunted across contact 5c and serves to disconnect the warning signal, e.g., a bell. The warning signal is connected to terminals 28 and 29 and is actuated by contact 5d of the relay 5.

The device is placed in operation by briefly pressing pushbutton 30. As photoresistor 2, 4 is connected as a potentiometer-resistor, the tube 1r fires when the measured value being monitored is in the nominal range so that photoresistor 2, 4 is illuminated. As a result, contact 5c closes and connects photoresistor 2, 4 across the operating voltage. Furthermore, contact 5d opens, so that the connected signal device is disconnected.

If photoresistor 2, 4 is cast in shadow when a given measured value is exceeded, either upward or downward, the potential across starter 13 drops; tube 1r is extinguished, and relay 5 drops. This connects the signal device via contact 5d. Moreover, contact 5c opens and breaks the circuit to photoresistor 2, 4. The latter now receives cathode potential via resistor 16, which is now effective. As a result the tube 1r remains extinguished even when photoresistor 2, 4 is again illuminated, e.g., when the quantity to be monitored has again reached its nominal range of values. The tube 1r can fire again only when pushbutton 30 is pressed and photoresistor 2, 4 is illuminated at the same time. If the latter is not the case, the ptoptoresistor is still in shadow and has a high resistance. For in this case no voltage that is adequate for firing can build up across the starter 13 when photoresistor 2, 4 is briefly connected across the line by actuation of the pushbutton 30. Actuation of disconnecting pushbutton 30 for the warning signal thus remains completely ineffective circuitwise until the measuring-device pointer is in the range of nominal values.

In the circuit shown in FIG. 4, photoresistor 2, 4 is connected in the "dark circuit." The circuit thus corresponds to the upper half of FIG. 2. Here relay 9 is provided with a rest contact 9c, as well as with the signal-circuit contact 9d. As the contact 9c is closed when the measuring-device pointer is in its normal state, pushbutton 30 need not be actuated to place the device in operation. The tube 1b remains extinguished as long as the measuring-device pointer is in the range of nominal values, as photoresistor 2, 4 is illuminated. If the latter is cast in shadow whenever the nominal value is exceeded either upward or downward, the tube 1b can fire. This pulls in the relay 9, which opens the contact 9c; moreover, the warning signal connected to the terminals 28 and 29 is connected in the already described manner. The opening of the contact 9c impresses a comparatively high potential across the photoresistor through the resistor 19. As in FIG. 3, the result of this is that the tube 1b can be extinguished and consequently the warning signal be disconnected by pressing the pushbutton 30 only if the measuring-device pointer is again in the range of normal values and photoresistor 2, 4 is illuminated at the same time.

What is claimed is:

1. Switching apparatus comprising a meter having a pointer, a switching circuit including photocell means in the path of the pointer, means on the pointer for masking the photocell means over a relatively small portion of the path of the pointer, a light source adjacent the meter, a shutter mounted for rotation with said pointer around the light source to block the light from the photocell means over a relatively large portion of the path of the pointer.

2. Apparatus according to claim 1, wherein the photocell means includes two photocells in a plane parallel to the axis of the meter spaced from each other along the path of the pointer and in the direction of said axis.

3. Apparatus according to claim 2, comprising a pair of gaseous discharge tubes including starter electrodes; a controlled relay having a winding connected between the anode and cathode of one of said tubes; an alternating voltage source; and circuits interconnecting said tubes, the voltage source and the photocells; and a resistor connected in series with each photocell across the voltage source to form a voltage divider circuit, a portion of each voltage divider circuit being connected between the starter electrode and cathode of each tube for controlling the firing of the tubes in response to the illumination of the photocells.

4. Apparatus according to claim 3, including means for applying a potential to the starter electrode of one of said tubes for preventing said one tube from changing its conductivity state when the illumination of the photocell connected to that tube changes.

5. Apparatus according to claim 3, including means for maintaining the controlled relay in its operated condition until the illumination of both photocells change.

6. Apparatus according to claim 1, including a gas discharge tube having a starter electrode, a cathode and an anode, a source of alternating voltage, a voltage divider circuit including said photocell means and a resistor connected in series, the starter electrode being connected to an intermediate point of the voltage divider circuit, relay means having a winding connected in series with said source between the anode and cathode, said relay means including contacts connecting said voltage divider circuit across said source.

7. Apparatus according to claim 6, including a manual switch connected in parallel with said last mentioned contacts for short circuiting the same.

8. Apparatus according to claim 7, wherein said last mentioned contacts are connected between the voltage divider circuit and the cathode.

9. Apparatus according to claim 7, wherein said last mentioned contacts are connected between voltage divider circuit and the side of said source connected to the anode.

10. Apparatus according to claim 6, wherein said last mentioned contacts are connected between the voltage divider circuit and the cathode.

11. Apparatus according to claim 6, including a capacitor connected between the starter electrode and cathode.

12. Switching apparatus comprising an electrical meter having a rotatable pointer and a scale, said pointer having a bent portion parallel to the axis of rotation of the meter, two photocells mounted behind the bent portion of the pointer and spaced from each other along the path of the pointer and in the direction of said axis, a switching circuit connected to said photocells, a pair of spaced oppositely extending vanes on the bent portion of the pointer for selectively masking the photocells over a relatively small portion of the path of the pointer, a light source adjacent the meter, a shutter mounted on the meter for rotation with said pointer around the light source to block the light from the photocells over a relatively large portion of the path of the pointer.

13. Switching apparatus wherein a pointer is adapted to rotate about a given point, a source of light positioned at said point, relatively small masking means positioned on said pointer toward the outer extremity thereof, said means being arranged to cast two relatively small displaced images, first and second photoresponsive means positioned so that they are responsive to said small images, respectively, and shutter means disposed about said light source and in close proximity thereto for rotation with said pointer, said shutter means comprising a first part adapted to cover a portion of said light source and a second part displaced from said first part and adapted to cover another portion of said light source, whereby said shutter means will cast an image having two relatively large displaced areas capable of energizing said first and second photoresponsive means respectively.

14. Switching apparatus wherein a pointer is adapted to rotate about a given point in a horizontal plane, a source of light positioned at said point, relatively small masking means positioned on said pointer toward the outer extremity thereof, said means being arranged to cast two relatively small vertically displaced images, first and second photoresponsive means vertically positioned so that they are responsive to said small images respectively, and shutter means disposed about said light source and in close proximity thereto for rotation with said pointer, said shutter means comprising a first part adapted to cover a portion of said light source and a second part vertically displaced from said first part and adapted to cover another portion of said light source, whereby said shutter means will cast an image having two relatively large vertically displaced areas capable of energizing said first and second photoresponsive means respectively.

References Cited in the file of this patent

UNITED STATES PATENTS 2,365,601  Sipman _____ Dec. 19, 1944